United States Patent [19]

Durand et al.

[11] Patent Number: 6,162,994

[45] Date of Patent: Dec. 19, 2000

[54] SHEATH FOR BUNCH OF WIRES

[75] Inventors: Hervé Durand, Dijon; Brigitte Nicole, Talant, both of France

[73] Assignee: Plasto S.A., France

[21] Appl. No.: 09/331,429

[22] PCT Filed: Jan. 9, 1998

[86] PCT No.: PCT/FR98/00034

§ 371 Date: Jun. 18, 1999

§ 102(e) Date: Jun. 18, 1999

[87] PCT Pub. No.: WO98/33191

PCT Pub. Date: Jul. 30, 1998

[30] Foreign Application Priority Data

Jan. 22, 1997 [FR] France ................................. 97 00637

[51] Int. Cl.⁷ .................................................. H01B 7/02
[52] U.S. Cl. ..................................................... 174/120 R
[58] Field of Search ....................... 174/120 R, 120 SR, 174/121 R, 121 SR, 121 A, 122 R, 107; 428/284

[56] References Cited

U.S. PATENT DOCUMENTS

| | | | |
|---|---|---|---|
| 3,614,299 | 10/1971 | Grail | 174/107 |
| 3,855,051 | 12/1974 | Lania et al. | 174/120 R X |
| 4,045,611 | 8/1977 | Torgerson | 174/121 SR |
| 4,707,569 | 11/1987 | Yoshimura et al. | 174/110 F X |
| 4,851,283 | 7/1989 | Holtrop et al. | 428/284 |
| 5,113,039 | 5/1992 | Guipe et al. | 174/113 |

FOREIGN PATENT DOCUMENTS 2664850  1/1992  France .
24 17 405  10/1975  Germany .

*Primary Examiner*—Dean A. Reichard
*Assistant Examiner*—Chau N. Nguyen
*Attorney, Agent, or Firm*—Ostrolenk, Faber, Gerb, & Soffen, LLP

[57] ABSTRACT

A sheath for a bundle of wires includes a layer of cellular material and a layer of reinforcing material. The cellular material layer is a plastic foam layer containing at least 80% of closed cells, and the reinforcing material layer is a nonwoven layer. The layers are made of the same material.

9 Claims, No Drawings

SHEATH FOR BUNCH OF WIRES

The present invention relates to the sheathing of bunches or bundles, especially bundles of electrical conductors in motor vehicles.

PRIOR ART

In motor vehicles in particular, electrical conductors are being increasingly used because of the many new functions that are offered to users, such as, for example, the operation of window lifters, seat adjustments and centralized locking. The numerous electrically conducting wires are grouped together into bundles so as to limit the space occupied in the various parts of the vehicle. However, grouping them into bundles has also raised the problem of seeking and finding the means of producing suitable sheaths able to receive and protect the wire bundles in an effective manner. More particularly, the sheath must withstand the temperatures developed, for example, in the engine compartment, must be sealed, so as to isolate the wire bundles, must exhibit acoustic insulation properties, so as to reduce to a minimum the noise which could be perceived by the users, and finally must have good mechanical strength in order to prevent premature wear due to rubbing on the structure of the vehicle to which the sheath is fixed. Such a list is far from being exhaustive.

Various techniques are known which allow the bundled wires to be held in place in motor vehicles:

- the conventional method consists in taping the wire bundle using an adhesive or non-adhesive tape which is wound, by turning around the bundle, in order to form a winding with overlapping turns; this method makes it possible to obtain well-grouped bundles but requires bulky machines and its productivity is limited;
- another method consists in using longitudinally split ringed sheaths into which the wires are introduced by forcing the slit to open, which slit then closes up by virtue of the elasticity of the rings. This type of sheath may be made of a polyamide, which gives it good temperature resistance and makes it possible for it to be used in car engine compartments. However, these sheaths have many drawbacks: their stiffness prevents them from being bent to a small radius, the edges of the slit and the ends are sharp and may injure the fingers of operators and the insulating protection for the wires; it is practically impossible to close the slit in a sealed manner and the wires may generate noise by impact with the wall of the sheath if the latter is not covered on the inside with a damping material;
- a third known method uses strips of flexible material which are folded in the form of a gutter around the wires and the two edges of which then have to be joined together in order to provide a sheath. A tape, coated with adhesive on its inner face, may be used and the two edges may be joined together by bringing the two adhesive edges face to face in order to obtain an assembly in the form of a flag, or, according to another method of assembly described in FR-2,664,850, a strip of heat-sealable material may be used, the two edges of which are welded in an autogenous manner by means of a blast of hot air. At the present time, the materials from which the strips intended for such a use are made are polyethylene foams, because of their good flexibility and their heat-sealability. Since the mechanical strength of this material is low, it is proposed to use a polyethylene foam reinforced for a polyamide mesh: the mesh structure for the reinforcement is necessary so that the face of each of the edges can be welded together when the two edges of the sheath overlap. By using closed-cell polyethylene foams, the sheath obtained is virtually sealed but, in the case of joining the two edges together in the form of a flag, there is a risk of the edges debonding due to the effect of the temperature, and this joining technique results in bundles which are more bulky and cannot be easily passed through perforations. Moreover, these polyethylene sheaths have a fairly low tear resistance and do not withstand high temperatures, thereby limiting their field of use.

Complex laminated materials comprising a layer of foam joined to a layer of nonwoven are known and described in U.S. Pat. No. 4,851,283, GB 2,112,319 and JP 05,229,045. These complex materials are used for covering walls or for manufacturing panels for the interior lining of vehicles, such as, for example, the headlining and/or the boots of the said vehicles. However, the panels are rigid and thermoformed in order to be adapted to the shape of the support structure. In addition, the foam layer does not necessarily comprise a percentage of closed cells as the panels are not designed to form an impermeable barrier, the latter being provided by other means. The main functions of such panels are to provide acoustic insulation and a degree of mechanical strength. This is why they have to be sufficiently thick, the complexes generally comprising different materials for the foam and the nonwoven.

SUBJECT OF THE INVENTION

With the aim of obtaining sheaths for bundles in motor vehicles having improved performance characteristics both in terms of their use and in their ability to provide effective protection of the electrical wires in motor vehicles, it has been found that it could be advantageous to produce sheaths using a laminated, flexible and conformable material comprising a layer of closed-cell foam intimately joined to a layer of nonwoven, the two layers being manufactured from the same heat-sealable material. A strip of the composite is preferably used according to the method in which the strip is folded into the form of a gutter and the two overlapping edges are welded together to form a longitudinal weld seam.

DESCRIPTION

According to one particular aspect of the present the invention, the bundles are sheathed by means of a strip of laminated complex material, the said sheathing material comprising a substantially liquid-impermeable first layer made of a closed-cell polyolefin foam and a nonwoven fabric second layer also made of a polyolefin.

Preferably, the layer of foam and the layer of nonwoven are both obtained from the same type of heat-sealable material so as:

1) to allow the two layers to be joined together by a thermal means, such as a flame treatment or a hot calendering operation, without the addition of an adhesive or of a meltable bonding material;
2) to enable the two edges of the complex to be autogenously welded after the sheath has been closed up around the bundle.

One of the preferred technical solutions for the technical realization of the invention consists in using the combination of an uncrosslinked polypropylene foam and a nonwoven which is also made of uncrosslinked polypropylene. This material, which may benefit from a fireproofing treatment so as to prevent flame spread, exhibits good heat resistance and the sheaths obtained are satisfactory for being used in the main parts of motor vehicles, such as, for example, the passenger compartment, the dashboard, the boot and certain areas of the engine compartment. The fireproofing treatment may be carried out, for example:

a) by mixing flame retardants with the polypropylene during formulation; before extrusion, so as to ensure that the compounds are dispersed throughout the mass and/or the nonwoven, or b) by spraying the fireproofing products on the foam and/or on the nonwoven.

The layer of foam must be flexible in order to be conformed easily: polyolefin foams comprising at least 80% of closed cells, the density of which is approximately 25 to 100 kg/m$^3$ and preferably 35 to 50 kg/m$^3$, are preferred and obtained in the form of a sheet having a thickness of between 1 and 3 mm.

By way of example, the extruded uncrosslinked polypropylene foams, consisting mainly of closed cells, are very suitable for carrying out the invention; these sheets, which have a high degree of closed cells and a surface which forms a skin, are virtually impermeable to liquids and make it possible to obtain a material which, at the same time, is flexible, impervious and soundproofing. As indicated above, it is advantageous to use a polyolefin foam treated in order to be fireproof and the sheets of fireproofed polypropylene foam used for manufacturing the material are commercially available.

The function of the layer of nonwoven material is to improve the mechanical strength (tensile strength and tear strength) and the surface appearance of the complex. Although it is possible to use different constituents, it is preferred to use a polyolefin nonwoven material of the same type as the constituent of the foam sheet; this choice makes it possible to obtain a homogeneous complex which can be assembled by hot calendering without the addition of an adhesive: thus, sheaths consisting of a single type of material, (for example polypropylene) are obtained which can thus be easily recycled. In order to obtain a satisfactory complex, a layer of nonwoven material having a thickness of approximately 0.3 to 0.8 mm and a mass per unit area of approximately 20 to 200 g/m$^2$, and preferably 50 to 150 g/m$^2$, is used; secondarily, the layer of nonwoven material may have received a fireproofing treatment using flame-spread retarders. It is also possible to use nonwoven textiles which have undergone a heat treatment (for example, at certain spots) which is intended to improve the mechanical strength. A preferred heat treatment is that which forms a check pattern on the nonwoven and which is designated as being a spot treatment. The check pattern may be obtained by means of a hot knurled roll which rotates against a flat (smooth) roll. Such a treatment increases the mechanical strength (tensile strength and tear strength) of the nonwoven, which is then designated as being heat-set.

The two layers may be joined together by any known method, such as by adhesives, heat-sealing films, flame treatment or hot calendering. It is preferred to use complexes assembled by hot calendering, which avoid the addition of adhesives and ensure that the assembly is temperature-stable and that the material is homogeneous.

According to the invention, the complex formed from the combination of a layer of foam and a layer of nonwoven is used to manufacture sheaths for wire bundles. The sheathing methods employed with this complex are preferably the methods using a strip of the complex, which is folded around the bundle and welded in an autogenous manner by means of a blast of hot air. Such a method is described, for example, in FR 2,664,850.

According to this method, the strip is placed parallel to and under the wire bundle, the foam side being against the wires. Passing the strip through the shaping unit folds it around the wires until the two edges of the strip partly overlap. A blast of hot air is then sent between the two edges so as to reach the softening point of the material locally, and then the two edges are brought into contact with each other so as to weld them together and to close the sheath. According to this method of closing the sheath, it may be seen that the external face (i.e. the nonwoven face) of the internal or covered edge (lying close to the wires) comes into contact with the internal face (i.e. the foam face) of the second, external or covering, edge of the strip: since the material of the two layers is of the same type and is heat-sealable, the conditions for obtaining a solid weld of the two edges are the most favourable.

As a variant, when the material of the complex is thermoformable, it is also possible to thermoform the strip in order to obtain a slit tube, then, subsequently, to introduce the wires via the slit and to weld the two edges of the slit, as in the previous method, in order to obtain the sheathed bundle.

According to this method of obtaining the sheath, the strip is placed so that the layer of foam is on the inside of the sheath and the stronger layer of nonwoven is on the outside. This arrangement has the advantage of providing a soft contact between the wires and a stronger surface on the outside of the sheath.

According to another aspect of the invention, it may be advantageous to choose the two layers to be of different colour, for example a white foam layer and the black nonwoven layer; after manufacture, the bundle will be black in colour (the nonwoven is on the outside). The presence of foam visible on certain parts of the bundle, which is easy to identify because of the contrast in colour, will be able to act as a tell-tale should there be a fault in the weld, or should there be wear due to extensive rubbing which would have significantly degraded the layer of nonwoven textile.

By way of example, a sheet of complex was produced from a sheet of uncrosslinked polypropylene foam, having a thickness of 1 mm, a density of approximately 35 kg/m$^3$, containing more than 80% of closed cells and being fireproofed, onto which was fixed, by hot calendering, a sheet of polypropylene nonwoven having a thickness of 0.4 mm and a mass per unit area of 75 g/m$^2$.

The sheet of polypropylene foam is supplied by the company PSG Sentinel under the reference Prop X® and the nonwoven is supplied by the company Don & Low Nonwovens under the reference Daltex 1080 D3V00. The foam is a translucent white in colour and the nonwoven, which has a chequered appearance obtained by thermocompression, is black in colour. According to the invention, this complex was cut into strips and used to manufacture a bundle sheath by longitudinal winding and autogenous welding of the two edges by means of hot air at 180° C. A sheathed bundle is thus obtained which is impermeable to water and to oils and satisfies the temperature conditions corresponding to Class T2.

By way of comparison, the strength performance of a sheath obtained according to the invention (thickness 1.5 mm) and the strength performance of a known control sheath made of polyethylene foam reinforced by a polyamide mesh (thickness 2.5 mm) were measured. The comparative results are given in the table below.

| Characteristics | According to the invention | Control |
| --- | --- | --- |
| Thickness (mm) | 1.4 to 1.6 | 2.4 to 2.6 |
| Temperature Class | T2 (105° C. continuous) | T1 (85° C. continuous) |
| Degradation stability | 240 h at 125° C. | 240 h at 105° C. |
| Tensile strength | 50 N/cm | 13 N/cm |
| Maximum elongation | 60% | 30% |
| Tear strength: | | |
| Longitudinal | 20 N | 2.5 N |
| Transverse | 25 N | 5 N |

The results obtained show a distinct advantage of the sheath obtained according to the invention, which has significantly improved characteristics.

The temperature resistance of the sheath according to the invention allows it to be assigned a "T2" classification and the significantly improved mechanical strength reduces the risk of tearing during the manufacture of the bundle, when fitting it into the vehicle and throughout the lifetime of the vehicle. It should also be noted that these strength values are obtained with a thinner material than the comparative product, that the processing on the sheathing machines does not present any more technical difficulty and that, because of the smaller thickness, the supply of strip to the machines (and therefore the autonomy thereof) may be considerably increased with, as direct consequence, an increase in the productivity of the wire-bundle manufacturing workshop.

Finally, since the sheath consists only of polypropylene, the recycling of scrap, either during manufacture or at the end of the vehicle's life, is facilitated.

What is claimed is:

1. Sheath for wire bundles comprising a layer of cellular material and a layer of reinforcing material, wherein the layer of cellular material is a layer of plastic foam having at least 80% of closed cells, in that the layer of reinforcing material is a nonwoven and in that the layers of foam and of nonwoven are made from the same material.

2. Sheath for wire bundles according to claim 1, wherein the same material is a polyolefin.

3. Sheath for wire bundles according to claim 2, wherein the polyolefin is an uncrosslinked polypropylene.

4. Sheath for wire bundles according to claim 1, wherein the foam layer is fireproofed.

5. Sheath for wire bundles according to claim 1, wherein the layer of nonwoven is heat treated beforehand.

6. Sheath for wire bundles according to claim 1, wherein the two layers are joined together using a thermal method.

7. Sheath for wire bundles according to one of claim 1, wherein the two layers are of different colour.

8. Sheath for wire bundles according to claim 1, it is produced by folding a strip comprising the two layers around the wire bundle and by producing a longitudinal autogenous weld along the two facing edges.

9. Sheath for wire bundles according to claim 1, the two layers are heat-sealable.

* * * * *